United States Patent [19]

Futami et al.

[11] Patent Number: 6,058,848
[45] Date of Patent: May 9, 2000

[54] UNDERWATER AND LAND TRAVEL SYSTEM

[75] Inventors: Hiroshi Futami; Kenjiro Futami, both of Shimonoseki, Japan

[73] Assignee: Koyo Engineering Co., Ltd., Yamaguchi, Japan

[21] Appl. No.: 09/037,201

[22] Filed: Mar. 9, 1998

[51] Int. Cl.[7] .................................................... A63G 3/06
[52] U.S. Cl. ............................ 104/71; 114/312; 114/322
[58] Field of Search ......................... 104/53, 71; 440/35, 440/12.66; 114/312, 313, 322, 325; 441/25

[56] References Cited

U.S. PATENT DOCUMENTS

| | | | |
|---|---|---|---|
| 808,487 | 12/1905 | Stahl | 104/71 |
| 929,972 | 8/1909 | M'Giehan | 104/71 |
| 1,056,929 | 3/1913 | Navarro | 104/71 |
| 1,781,134 | 11/1930 | Shoemaker | 114/322 |
| 3,390,640 | 7/1968 | Couttet et al. | 104/71 |
| 4,195,380 | 4/1980 | Higgs | 441/25 |
| 5,215,016 | 6/1993 | Futami | 104/71 |
| 5,775,226 | 7/1998 | Futai et al. | 104/71 |

*Primary Examiner*—Sherman Basinger
*Attorney, Agent, or Firm*—Koda & Androlia

[57] ABSTRACT

An underwater and land travel system comprising an underwater and land travel vehicle which is capable of being reliably and safely moved from on the land into the water and which may also be used for viewing the sight in the water with delight and safety irrespective of the weather or the like. There is provided a vehicle capsule in an underwater and land travel system comprising a vehicle body which has a vehicle capsule releasably placed on an upper portion thereof and which is capable of being moved along the travel rails which are laid to extend from on the land into the water under influence of the buoyancy of the vehicle body in the water and under the force of gravity on the land, the vehicle body and the vehicle capsule being connected to each other by a wire, and a drawing and rewinding device disposed in the vehicle body for drawing and rewinding the wire, the vehicle capsule being separated from the vehicle body in the state in which the vehicle body has been moved at any location in the water, and the vehicle capsule being floated in the water or on the water by the drawing and rewinding device for drawing the wire at a certain length.

2 Claims, 10 Drawing Sheets

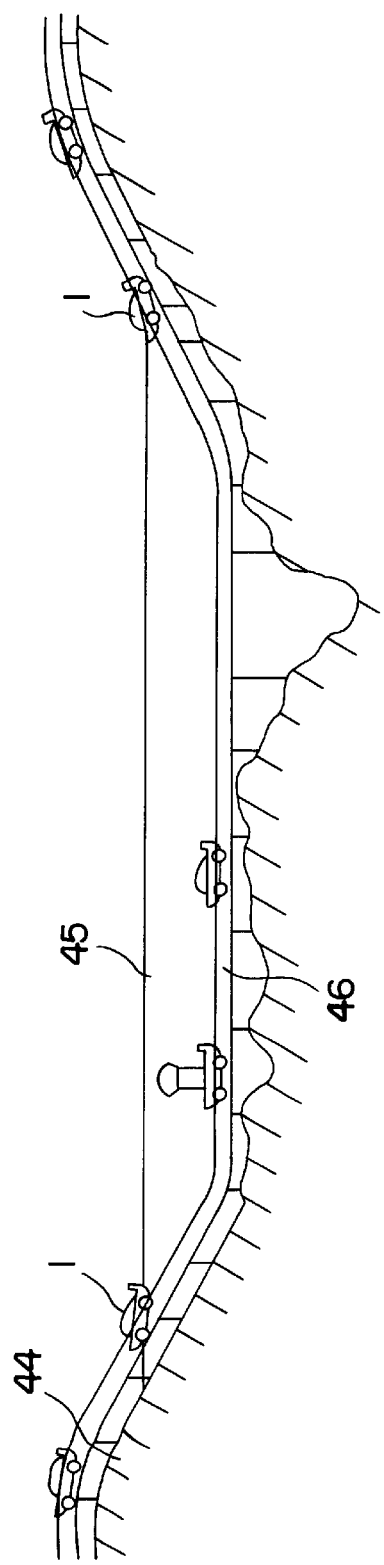

UNDERWATER AND LAND TRAVEL SYSTEM

FIELD OF THE INVENTION

The present invention relates to an underwater and land travel system, and particularly, to an underwater and land travel system comprising an underwater and land travel vehicle which is capable of traveling between on a land and in the water along a travel rail in the state in which a vehicle capsule has floated in the water, so that the vehicle capsule for getting-in passengers mounted on the underwater and land travel vehicle is capable of floating in the water or on the water.

BACKGROUND OF THE INVENTION

In general, a submarine with passengers or loads loaded therein is conventionally used as a vehicle cruising in the water such as sea or lake, and, in recent years, such submarine has been utilized as leisure submarine used for viewing the sight in the water or the like.

However, the above submarine suffers a problem that it is impossible to operate it in a stormy weather, resulting in a disadvantage arisen in many cases, and it is impossible to give a sightseer satisfaction.

SUMMARY OF THE INVENTION

Accordingly, it is an object of the present invention to provide an underwater and land travel system comprising an underwater and land travel vehicle which is capable of being reliably and safely moved from on the land into the water and which may also be used for viewing the sight in the water with delight and safety irrespective of the weather or the like.

To achieve the above object, according to an aspect and feature of the present invention, there is provided a vehicle capsule in an underwater and land travel system comprising a vehicle body which has a vehicle capsule releasably placed on an upper portion thereof and which is capable of being moved along the travel rails which are laid to extend from on the land into the water under influence of the buoyancy of the vehicle body in the water and under the force of gravity on the land, the vehicle body and the vehicle capsule being connected to each other by a wire, and a drawing and rewinding device disposed in the vehicle body for drawing and rewinding the wire, the vehicle capsule being separated from the vehicle body in the state in which the vehicle body has been moved at any location in the water, and the vehicle capsule being floated in the water or on the water by the drawing and rewinding device for drawing the wire at a certain length.

In such feature according to the present invention, the vehicle body which has a vehicle capsule placed thereon can be moved from on the land into the water along the travel rails, the vehicle capsule being separated from the vehicle body in the state in which the vehicle body has been moved at any location in the water, the vehicle capsule may be floated in the water or on the water by drawing of the wire to a certain length by the operation of the drawing and rewinding device, so that the vehicle capsule can be used for viewing the sight in the water or on the water, and the vehicle capsule can be mounted on the vehicle body by rewinding the wire by the operation of the drawing and rewinding device. Further, in the state in which the vehicle capsule has been mounted on the vehicle body, the vehicle capsule can be used for viewing the sight in the water by moving the vehicle capsule to travel along the travel rails. In addition, in the state in which the vehicle capsule has been floated in the water or on the water, the vehicle capsule can also be used for viewing the sight in the water or on the water. Therefore, by applying the present invention to game facilities such as an amusement park or the like, it is possible to provide a very joyful viewing facilities.

Further, the drawing and rewinding device may be comprised at least any one of devices such as a fluid fin for giving a certain load to the drawing of the wire, a brake device for stopping the drawing of the wire and a rewinding driving motor for rewinding the wire.

With such feature of the drawing and rewinding device, the fluid fin may be driven in rotation by the wire when the wire is drawn out, so that the drawing of the wire has a certain load by the resistance to the rotation of the fluid fin in the water. When the vehicle capsule has been separated from the travel vehicle body, the vehicle capsule may be stopped at any location in the water or on the water by the operation of the brake device for stopping the drawing of the wire. Then, by rewinding the wire by the rewinding driving motor 20, the vehicle capsule may be drawn to the vehicle body, so that the vehicle capsule can be placed on the vehicle body. Consequently, the vehicle capsule can be safely floated on the water.

Further, by mounting a self-traveling device on the vehicle capsule, the self-traveling device can be operated in the state in which the vehicle capsule has been separated from the vehicle body.

According to the above feature, in the state in which the vehicle capsule has been separated from the vehicle body, the vehicle capsule can be moved in the water or on the water independently from the vehicle body by the operation of the self-traveling device.

Further, in the state in which the vehicle capsule has floated on the water, the wire may be removed from the vehicle capsule and the vehicle capsule is capable of being moved on the water, thus, the vehicle capsule may be moved on the water by itself by the operation of the self-traveling device.

Further, by mounting a float control mechanism on the vehicle capsule for controlling a floating location and a floating direction of the vehicle capsule, the wire may be removed from the vehicle capsule in the state in which the vehicle capsule has floated on the water, the vehicle capsule may be moved on the water by itself by the operation of the self-traveling device and by the float control mechanism.

According to the above feature, in the state in which the vehicle capsule has been separated from the vehicle body, the wire can be removed from the vehicle capsule, so that the vehicle capsule can be moved in the water or on the water by itself by the operation of the self-traveling device and by the float control mechanism.

BRIEF DESCRIPTION OF THE DRAWINGS

FIG. 10 is an illustration of a travel system for the travel vehicle according to the present invention;

DETAILED DESCRIPTION OF THE PREFERRED EMBODIMENTS

Figure 1:
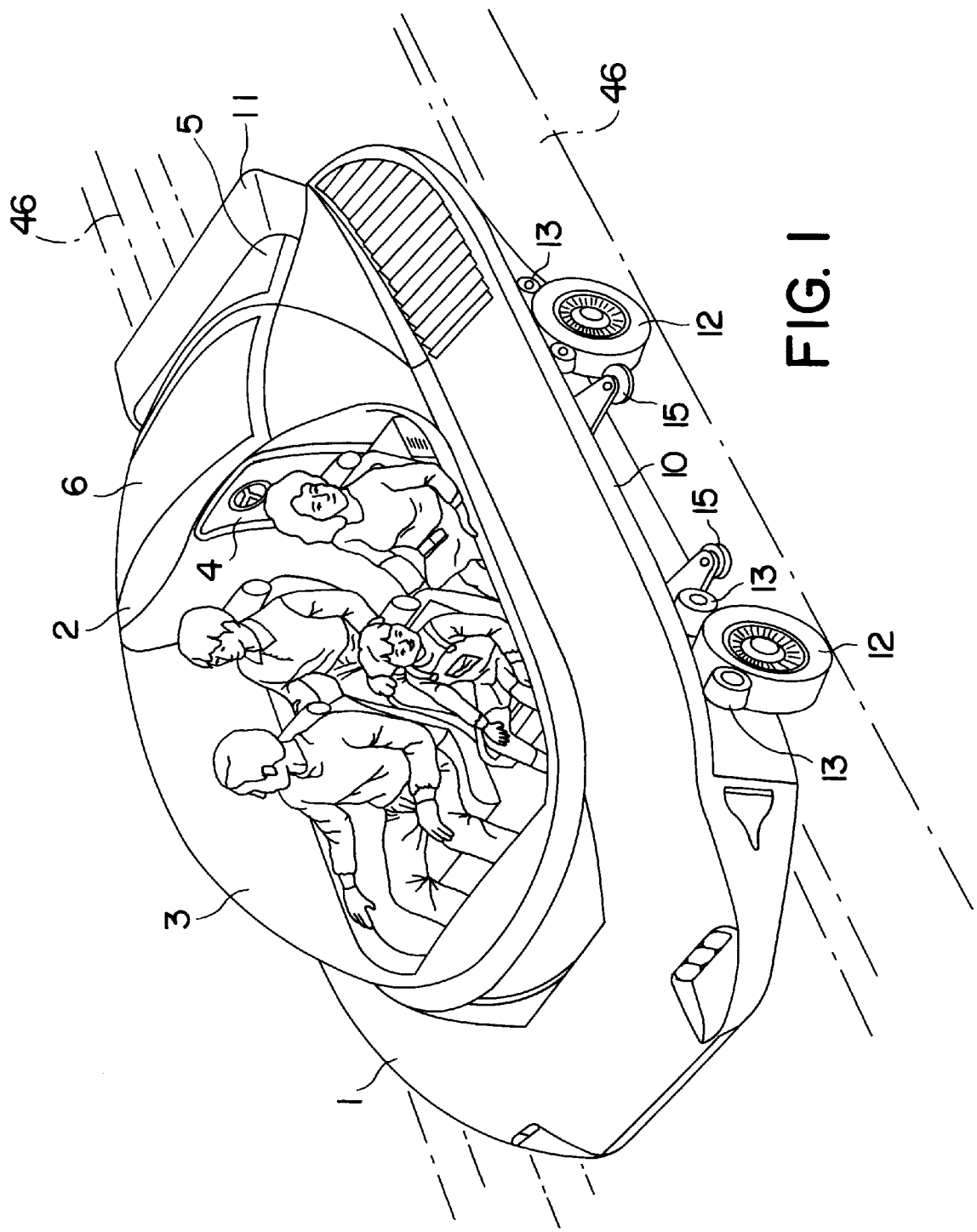
FIG. 1 is a perspective view illustrating an underwater and land travel vehicle used in an underwater and land travel system according to the present invention.
Figure 2:
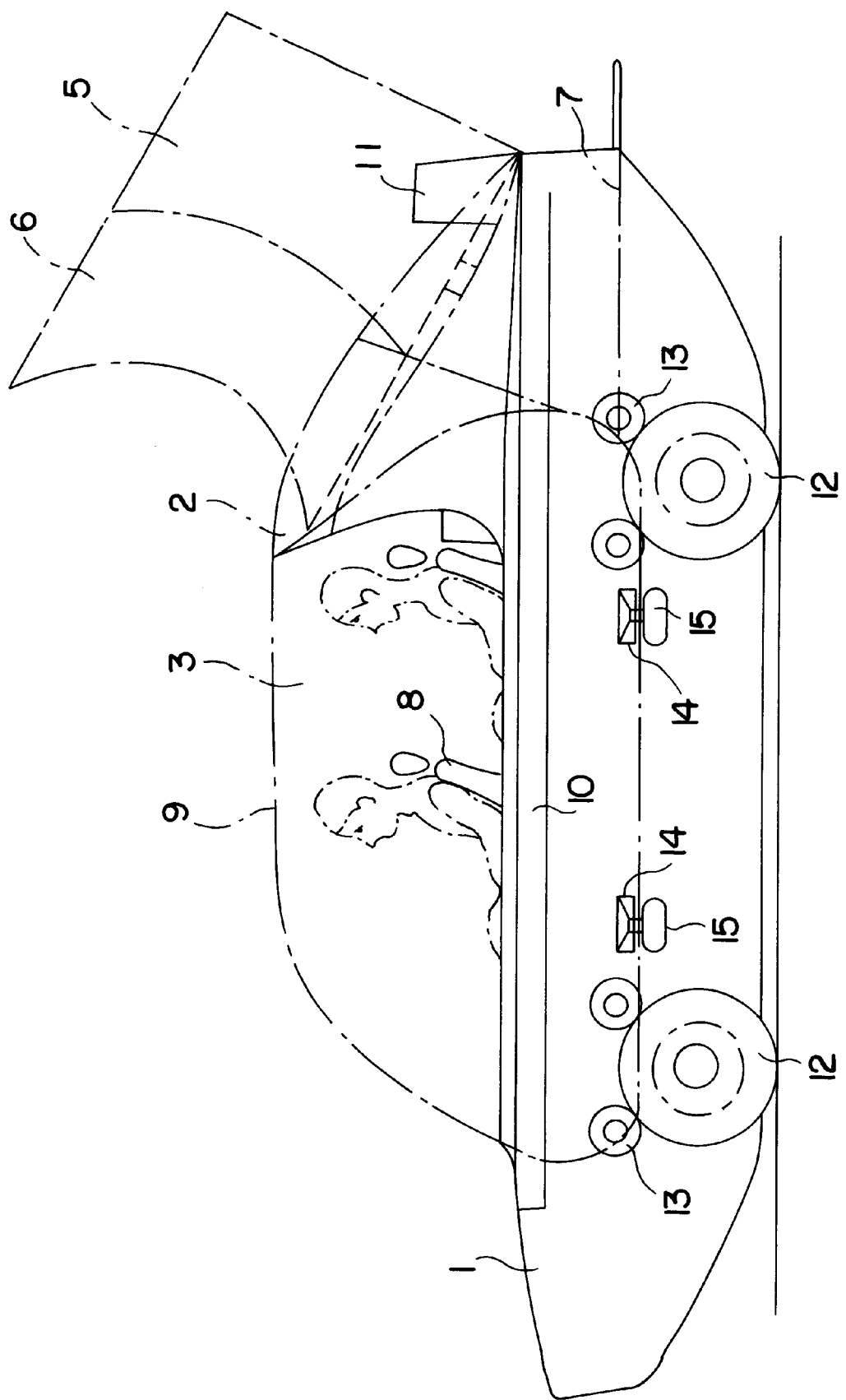
FIG. 2 is a side view of the travel vehicle according to the present invention.
Figure 3:
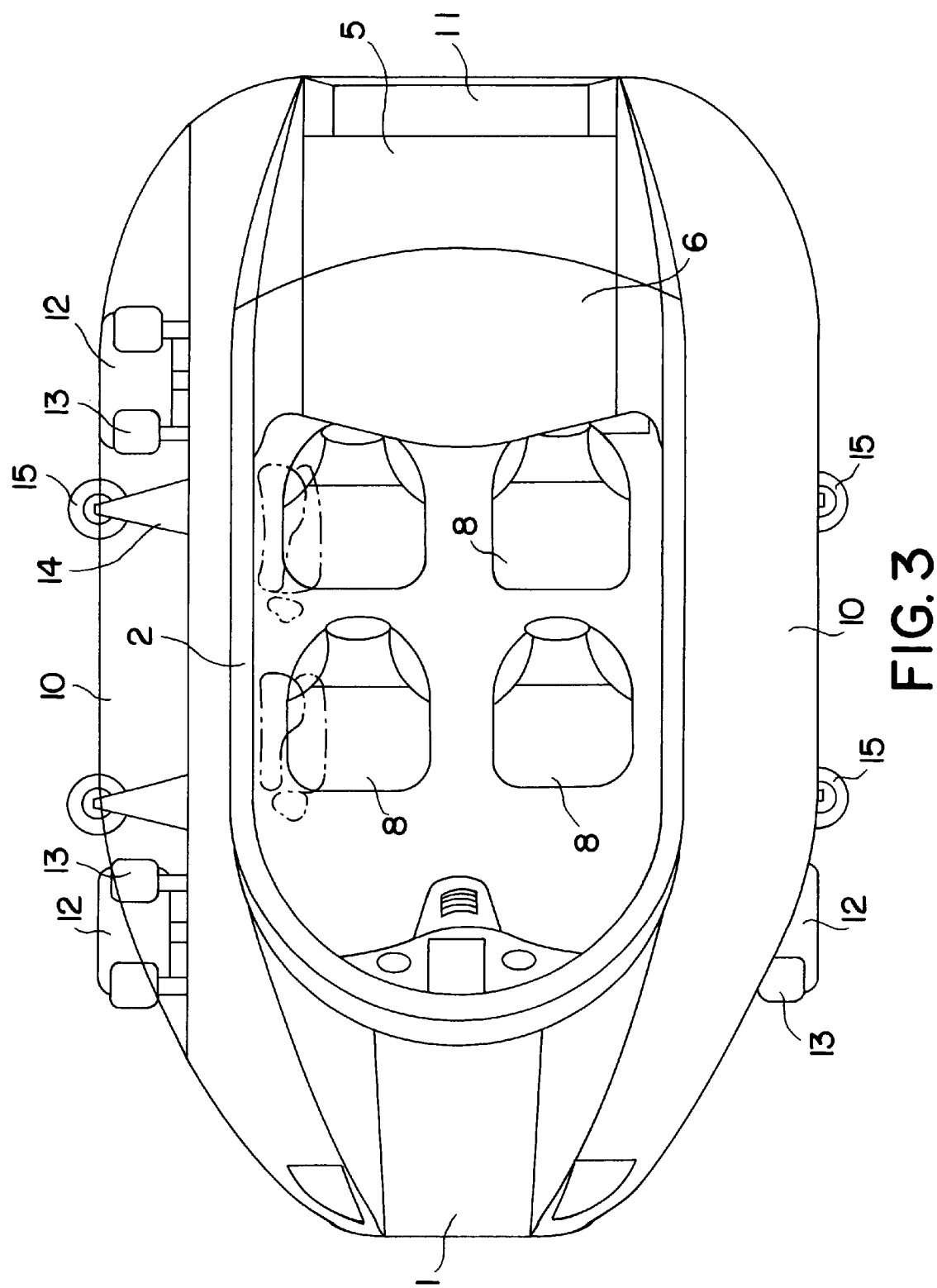
FIG. 3 is a plan view of the travel vehicle according to the present invention.
Figure 4:
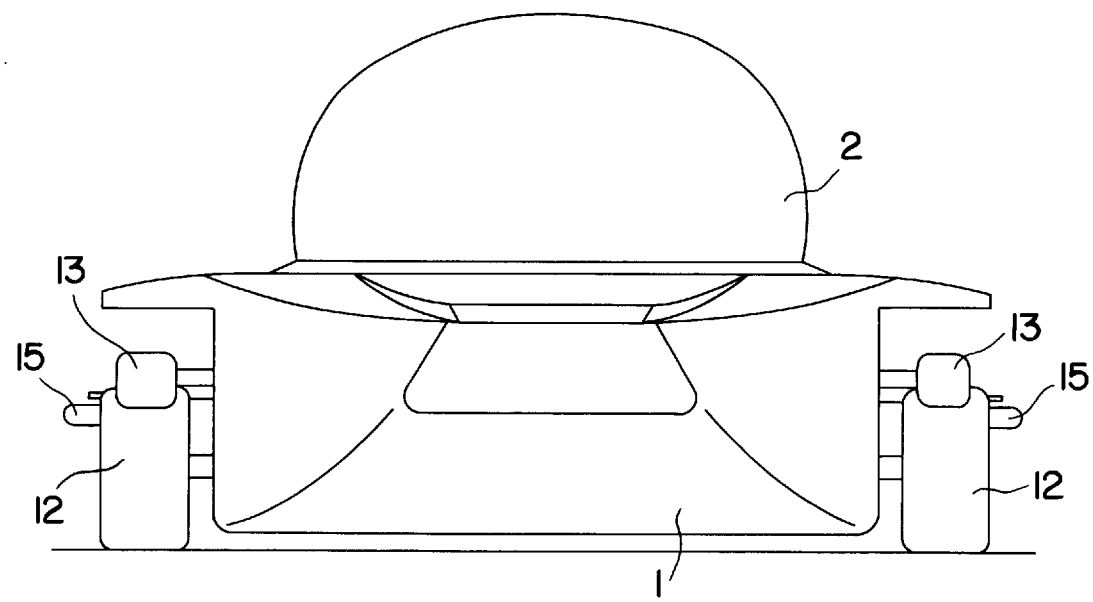
FIG. 4 is a front view of the travel vehicle according to the present invention.
Figure 5:
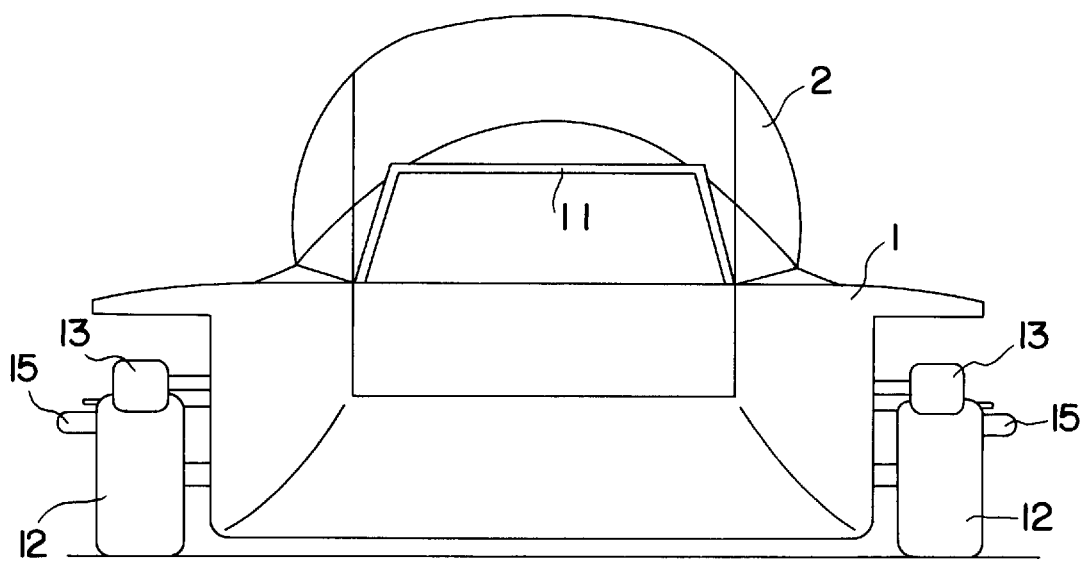
FIG. 5 is a rear view of the travel vehicle according to the present invention.

The embodiments of the present invention will be described hereunder with reference to FIGS. 1 to 12.

FIGS. 1 to 5 show an embodiment of an underwater and land travel vehicle used in an underwater and land travel system according to the present invention. A vehicle capsule 2 is mounted on an upper portion of a vehicle body 1 which is made of a material such as FRP (fiber-reinforced plastics) and acrylic resins, and a passenger compartment 3 is provided within the vehicle capsule 2 in this embodiment. An internal hatch 4 is openably and closably disposed in rear of the passenger compartment 3 for partitioning the inside and the outside of the compartment 3 in an air-tight manner. External hatches 5 and 6 are disposed at rear portions of the vehicle body 1 and the vehicle capsule 2, respectively, so that they can be opened and closed laterally in one piece about one sides thereof. A step 7 for movement of the passengers or occupants when getting-on and -off the vehicle is disposed below the vehicle body 1 and between the inside of the external hatches 5 and 6 and the internal hatch 4 of the vehicle capsule 2.

A plurality of seats 8 are disposed, for example, in two front and rear rows, within the passenger compartment 3. A window 9 having a pressure resistance and made of a transparent material such as glass is integrally mounted at an upper portion of the compartment 3. The window 9 ensures that an occupant seated on the seat 8 can view forward, upward and sideways sights from the inside.

Wing-like side covers 10 are integrally formed on upper edges of opposite sides of the vehicle body 1 to project sideways. A wing 11 is mounted to lower end edges of the external hatches 5 and 6 of the vehicle body 1 to extend sideways at a predetermined distance spaced apart from the surfaces of the external hatches 5 and 6.

Four main tires 12 are disposed at front and rear locations below the side covers 10 on the opposite sides of the vehicle body 1. In this embodiment, two smaller-diameter auxiliary tires 13 are disposed on an upper portion of each of the main tires 12, so that their peripheral surfaces abut against an outer peripheral surface of the main tire. The auxiliary tires 13 are disposed on the vehicle body 1 to keep the upper side thereof at a fixed height. Further, guide arms 14 are mounted on the opposite sides of the vehicle body 1 between the front and rear main tires 12 to protrude sideways. A guide tire 15 is rotatably mounted at a tip end of each of the guide arms 14 in such a manner that its tip end protrudes from outer end face of the main tire 12.

Figure 6:
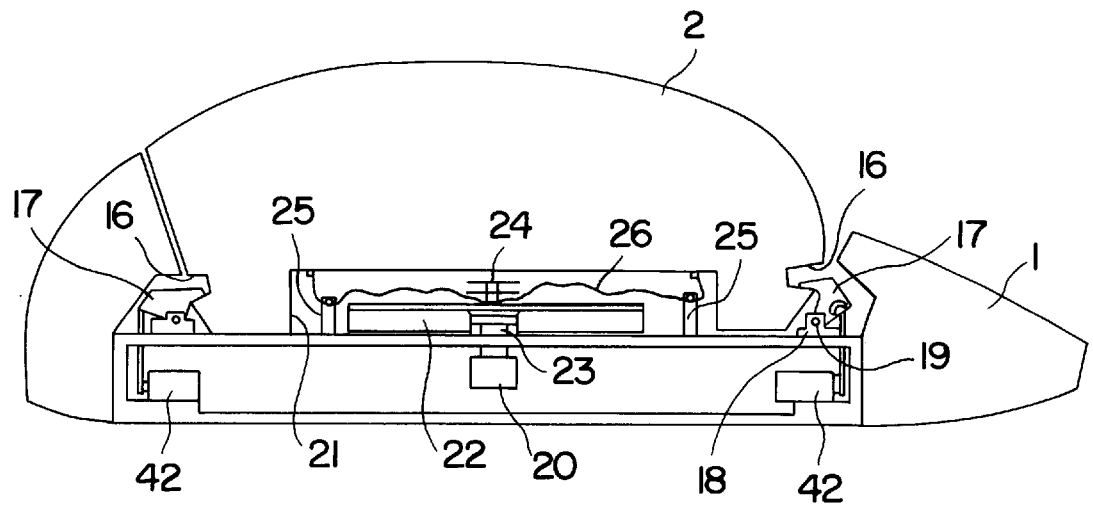
FIG. 6 is a vertical sectional view illustrating an escaping device in a vehicle capsule of the travel vehicle according to the present invention.
Figure 7:
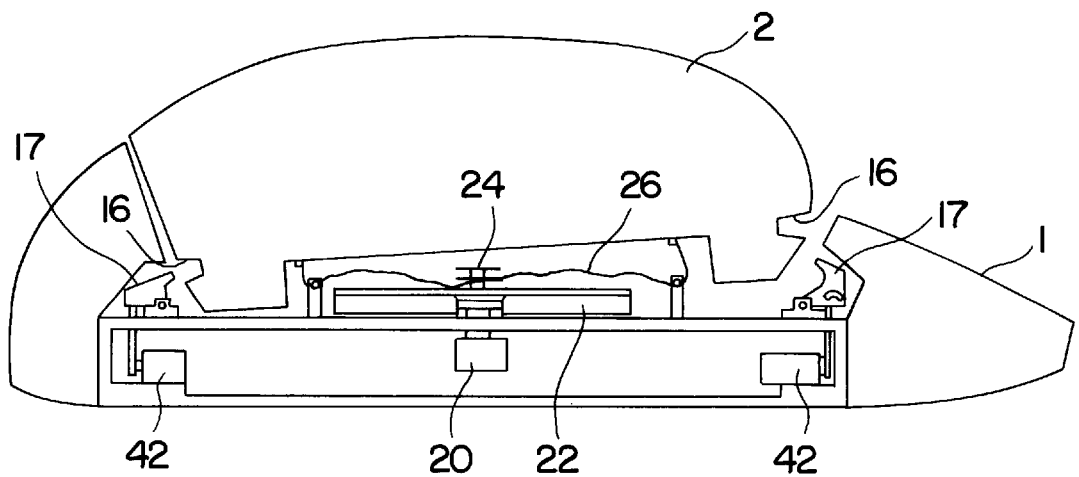
FIG. 7 is a view illustrating the vehicle capsule of the travel vehicle in a state in which the vehicle capsule has just been separated.
Figure 8:
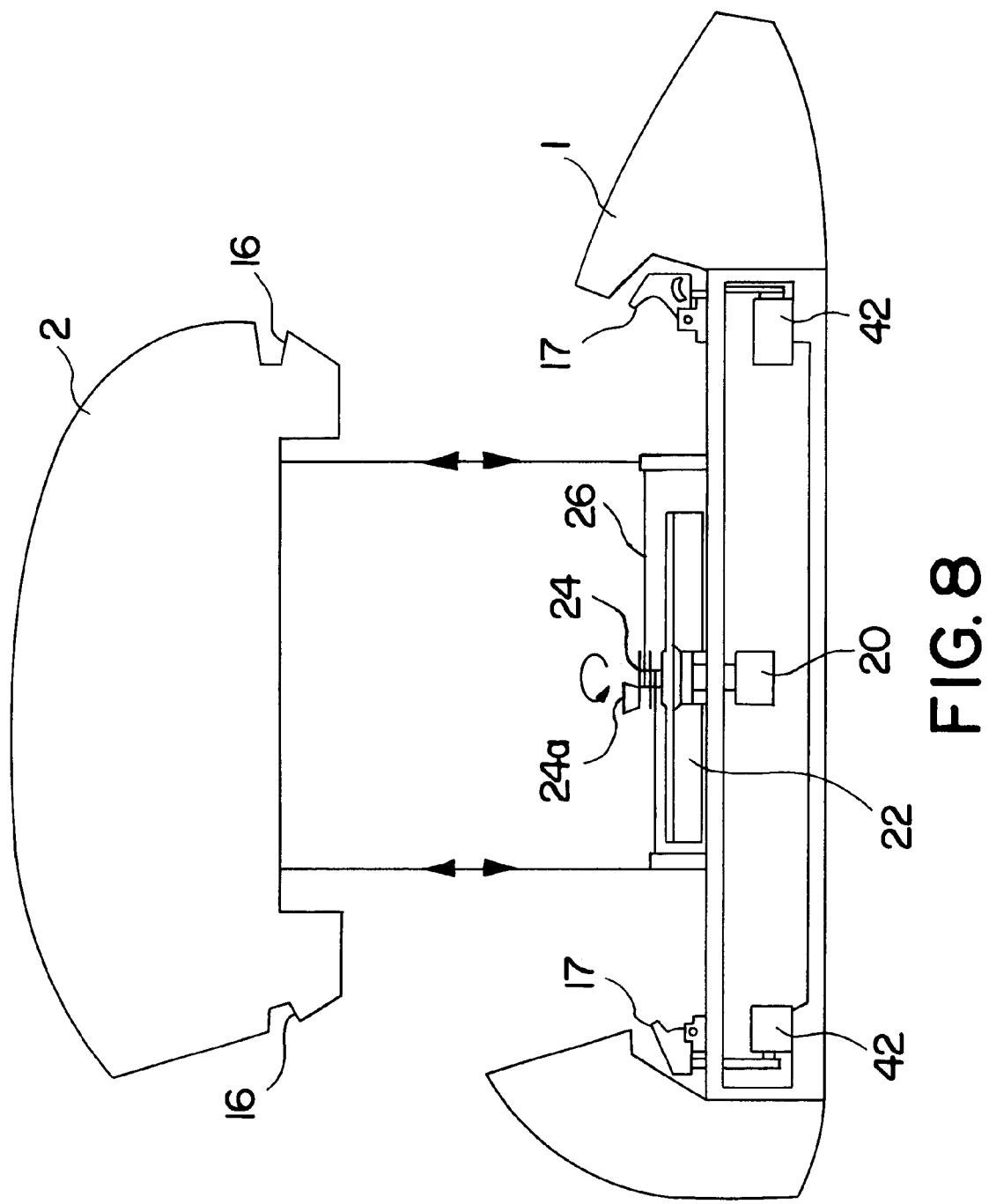
FIG. 8 is a view illustrating the vehicle capsule of the travel vehicle in a state in which the vehicle capsule has been separated.
Figure 9:
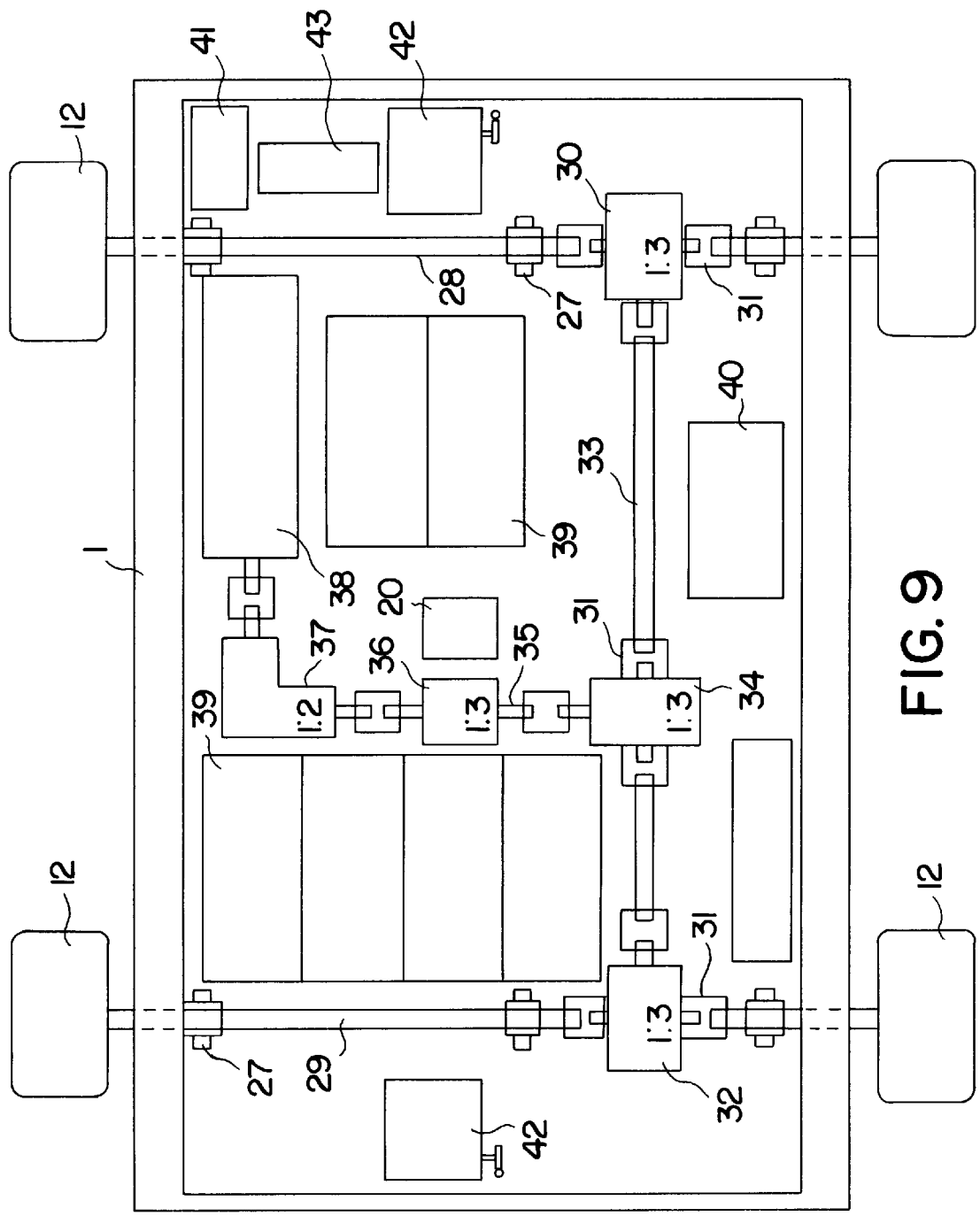
FIG. 9 is a diagrammatic illustration of the inside of the travel vehicle according to the present invention.

In the present embodiment, locking grooves 16 are defined in front and rear portions of the vehicle capsule 2, as shown in FIGS. 6 to 8. A movable hook 17 is disposed for longitudinally swinging movement about a support pin 19 of a base 18 at a location in the vehicle body 1 corresponding to the locking grooves 16. Thus, the vehicle capsule 2 can be separated from the vehicle body 1 by swinging the movable hook 17 to release the engagement of the movable hook 17 in the locking groove 16.

Further, a recess 21 is defined in a central portion of a lower surface of the vehicle capsule 2, and a fluid fin 22, as a drawing and rewinding device, is disposed on an upper surface of the vehicle body 1 at a location corresponding to the recess 21 for rotation about a rotary shaft 23. Furthermore, a rotary pulley 24 is coaxially mounted at an upper end of the rotary shaft 23 of the fluid fin 22, and wire guides 25 stand in the front and rear vicinities of the fluid fin 22 of the vehicle body 1. A wire 26 of a predetermined length is connected at front and rear locations on an inner surface of the recess 21 in the vehicle capsule 2. The wire 26 is wound in the same direction around the rotary pulley 24 through the wire guides 25. Further, in the present embodiment, the wire 26 can be removed from the vehicle capsule 2.

In case the wire 26 is drawn out, the rotary pulley 24 and the fluid fin 22 are rotated integrally by clutch mechanism (not shown). However, in case the wire 26 is rewound, the rotary pulley 24 may be rotated separately with the fluid fin 22. Further, a rewinding driving motor 20 is connected to the rotary pulley 24 as drawing and rewinding device, the rewinding driving motor 20 is disposed within the travel vehicle body 1 for driving the rotary pulley 24 in rotation when the wire 26 is rewound. A brake device 24a is also mounted on the rotary pulley 24 capable of stopping the rotary pulley 24 at any desired position. When the vehicle capsule 2 floats under influence of the buoyancy of the vehicle capsule 2 by separating from the vehicle body 1, the wire 26 may be drawn out. Thus, the rotary pulley 24 and the fluid fin 22 are rotated integrally by the wire 26, so that the drawing of the wire 26 is limited by the resistance to the rotation of the fluid fin 22 in the water, thereby controlling the floating of the vehicle capsule 2. During floating, the vehicle capsule 2 may be stopped at any desired location by the operation of the brake device 24a. Further, in the state in which the vehicle capsule 2 may be stopped in the water, the wire 26 may be rewound by driving the rotary pulley 24 in rotation through the operation of the rewinding driving motor 20, so that the vehicle capsule 2 may be placed on the vehicle body 1.

In the present embodiment, the wire 26 may be drawn out by the rotation of the rotary pulley 24 and the fluid fin 22, and may be rewound by the operation of the rewinding driving motor 20. However, the drawing and rewinding of the wire 26 may be controlled independently by the driving motor. Further, any one or any combination of the devices such as the fluid fin 22, brake device 24a and rewinding driving motor 20 may be mounted on the vehicle body 1.

A front driving shaft 28 having the front main tire 12 secured thereto and a rear driving shaft 29 having the rear main tire 12 secured thereto are disposed respectively at front and rear locations within the vehicle body 1 and rotatably supported through bearings 27. A front differential gear 30 is disposed at a middle portion of the front driving shaft 28 through a coupling 31, while a rear differential gear 32 is disposed at a middle portion of the rear driving shaft 29 through a coupling 31. The differential gears 30 and 32 are connected to each other by a drive shaft 33, and a center differential gear 34 is disposed at a middle portion of the drive shaft 33 through a coupling 31. Further, a transmitting shaft 35 is connected to the center differential gear 34, and a gear box 36 is disposed at a middle portion of the transmitting shaft 35. A bevel gear box 37 is connected to the gear box 36 for changing the direction of the transmitting shaft 35 by 90 degrees, and an output shaft of a driving motor 38 is connected to the bevel gear box 37. Thus, the front and rear driving shafts 28 and 29 are rotated through the bevel gear box 37, the gear box 36, the center differential gear 34, the front differential gear 30 and the rear differential gear 32 by the rotational driving of the drive motor 38, whereby the main tires 12 can be driven in rotation. A plurality of batteries 39 for driving the drive motor 38 are disposed in a space in the travel driving mechanism within the vehicle body 1, and a drive control device 40 for controlling the driving of the drive motor 38 is also disposed in such space. In the present embodiment, the travel driving of the vehicle body 1 is automatically controlled by a remote control by radio and hence, a receiver 41 for receiving the radio is disposed within the vehicle body 1. Further, an actuator 42 for turning the movable hook 17 is disposed within the vehicle body 1, and an actuator battery 43 for operating the actuator 42 is also disposed within the vehicle body 1, so that the movable hook 17 is swung by the operating the actuator 42 to release the engagement of the movable hook 17 in the locking groove. The actuator 42 may be operated by a remote control as is the travel operation, or may be operated manually by the passenger or occupant in the compartment in the vehicle capsule 2.

In the present embodiment, a water injection port and a water discharge port (not shown) are provided at front and rear portions of the vehicle body 1, respectively. Thus, when the vehicle travels in the water, the vehicle is a bilged type vehicle in which water enters the inside of the vehicle body 1. To this end, the travel driving mechanism, the battery 39 and the like are subjected to a water-proofing treatment, so that they withstand the entering of water.

FIG. 10 shows one embodiment of a travel system for causing the traveling of the vehicle body 1 constructed in the above manner. For example, a travel rail 46 is laid to extend from the land through the water such as sea water. A front- and a back-end of the single travel rail 46 may be laid apart from each other so that the vehicle body 1 reciprocally travels on the travel rail 46, as shown in FIG. 10, or the travel rail 46 may be laid in a loop fashion, so that the vehicle body 1 travels around on the rail 46.

Travel rails 46 may be C-shaped in section, as shown in FIG. 11, and may be laid parallel, so that their open end faces are opposed to each other. Thus, the vehicle body 1 is placed on the travel rails 46 by locating the main tires 12 and the auxiliary tires 13 inside the travel rails 46. In this state, the guide tires 15 abut against inner sides of the travel rails 46.

In the present embodiment, a pair of travel rails 46 may be laid so that the vehicle body 1 travels between the travel rails 46. The travel rails 46 may also be formed into the almost I-shape having the C-shape in section so that the vehicle body 1 travels along the single travel rail 46. In this case, the main tire 12 may be disposed in a central portion of a lower surface of the vehicle body 1.

The operation of this embodiment will be described below.

In this embodiment, first, in the state in which the vehicle body 1 has been located on the land 44, the external hatches 5 and 6 of the vehicle body 1 and the vehicle capsule 2 are opened. And the passengers board on the vehicle. Then, the internal hatch 4 is closed, and the external hatches 5 and 6 are closed. This causes the insides of the vehicle capsule 2 and the passenger compartment to be maintained air-tight. In this case, an appropriate amount of oxygen is constantly supplied into the passenger compartment 3, although being not shown.

Then, by conducting the travel operation of the vehicle by the remote control by radio or by a manual operation by the passenger or occupant, a control signal is received by a receiver 41, whereby the driving of the drive motor 38 is controlled by the drive control device 40. Then, the front and rear driving shafts 28 and 29 are driven in rotation through the bevel gear box 37, the gear box 36, the center differential gear 34, the front differential gear 30 and the rear differential gear 32 by the rotational driving of the drive motor 38, whereby the main tires 12 are driven in rotation to cause the vehicle body 1 to travel.

Figure 11A:
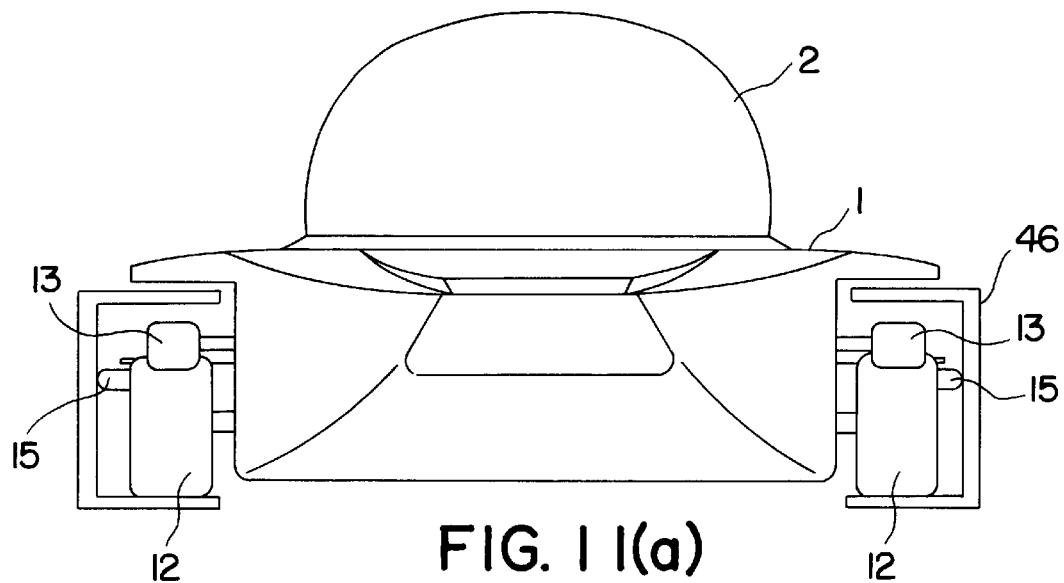
FIG. 11(a) is a view illustrating the vehicle during traveling of the vehicle on the land.

In this case, the force of gravity is applied to the vehicle body 1 on the land and hence, the main tires 12 abut against the inner lower surfaces of the travel rails 46, as shown in FIG. 11(a), so that the vehicle is moved along the travel rails 46 by the rotational driving of the main tires 12.

Figure 11B:
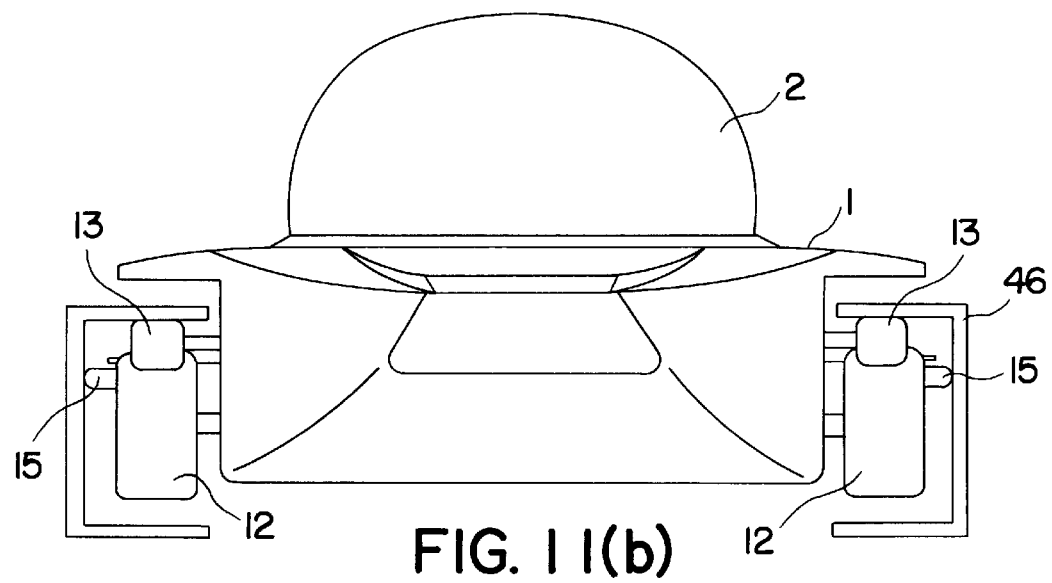
FIG. 11(b) is a view illustrating the vehicle during traveling of the vehicle in the water.

When the vehicle body 1 has been moved along the travel rails 46 and submerged into the water 45, water is allowed to enter into the vehicle body 1 through the water inlet port, so that the vehicle body 1 floats inside the travel rails 46 under influence of the buoyancy of the vehicle body 1 and the buoyancy of air in the compartment 3. As a result, the main tires 12 are spaced apart from the inner lower surface of the travel rails 46 to abut against the inner upper surface of the travel rails 46, as shown in FIG. 11(b). In this case, the auxiliary tires 13 are rotated in a direction opposite from the direction of rotation of the main tires 12, because they are in contact with the main tires 12. Thus, the direction of rotation of the main tires 12 is maintained intact, and the vehicle body 1 is moved in the water 45 along the inner upper surfaces of the travel rails 46 by the auxiliary tires 13. The auxiliary tires 13 may be driven by an another driving system, independently from a driving system for the main tires 12.

When the vehicle body 1 has been moved from in the water into the air along the travel rails 46, the buoyancy is lost, and the force of gravity is applied. Thus, the vehicle body 1 to be lowered, causing the main tires 12 to abut against the inner lower surfaces of the travel rails 46, so that the vehicle is moved along the travel rails 46 by the rotational driving of the main tires 12.

In this embodiment, when the vehicle body 1 has moved to any location in the water, the vehicle body 1 may be stopped, then the actuator 42 is operated by the remote control or the driver's operation to swing the movable hook 17, thereby releasing the engagement of the movable hook 17 in the locking groove 16, as shown in FIG. 7. Then, the vehicle capsule 2 is separated from the vehicle body 1, thereby the vehicle capsule 2 to be floated under influence of the buoyancy of the vehicle capsule 2. In this case, the vehicle capsule 2 is connected to the vehicle body 1 through the wire 26. Thus, the application of a tension to the wire 26 with the floating of the vehicle capsule 2 causes the wire 26 to be drawn out, so that the rotary pulley 24 is rotated by the wire 26. This allows the fluid fin 22 to be drive in rotation, so that the drawing of the wire 26 is limited by the resistance to the rotation of the fluid fin 22 in the water, thereby controlling the floating of the vehicle capsule 2.

Figure 12:
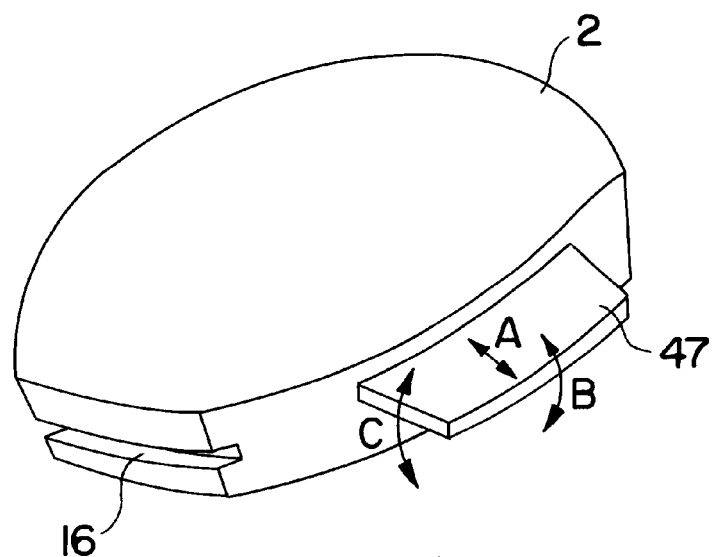
FIG. 12 is a diagrammatic perspective view illustrating the vehicle capsule having wings according to the present invention.

In this case, for example, a float control mechanism may be disposed on a certain position of the vehicle capsule 2 such as the opposite side or the upper side or the like to control a floating position and a floating direction of the vehicle capsule 2. In the float control mechanism, a wing 47 may be mounted on the opposite side of the vehicle capsule 2, slidably to the direction of arrow A and angle variably to the direction of arrows B and C, as shown in FIG. 12. For the above, during the floating of the vehicle capsule 2, a floating position and a floating direction of the vehicle capsule 2 can be controlled by the operation of the wing 47. In this case, the wing 47 may also be operated at fixed state or to be secured on the vehicle capsule 2.

When the vehicle capsule 2 floated at any location in the water, the vehicle capsule 2 may be stopped at a certain location in the water by stopping the rotation of the rotary pulley 24 through the operation of the brake device 24a. Under this condition, the vehicle capsule 2 can be used for viewing the sight at any location in the water. Further, the vehicle capsule 2 can be moved during the floating caused by the moving of the vehicle body 1.

When the viewing the sight in the water or the like is completed in the state in which the vehicle capsule 2 has been floated, the wire 26 may be rewound by driving the rotary pulley 24 in rotation through the operation of the rewinding driving motor 20, so that the vehicle capsule 2 may be drawn to the vehicle body 1. The movable hook 17 is swung by operating the actuator 42 to lock in the locking groove 16 in the state in which the vehicle capsule is placed on the upper portion of the vehicle body 1, so that the vehicle capsule 2 may be placed on the vehicle body 1.

Then, the vehicle body 1 travels along the travel rails 46, so that the vehicle capsule 2 can be floated again on the water from at any location in the water.

By mounting a self-traveling device such as a simple screw on the vehicle capsule 2, the wire 26 may be removed after floating of the vehicle capsule 2 onto the water, so that the vehicle capsule 2 can be moved on the land by itself through the self-traveling device.

Further, by mounting a self-traveling device and a fin 47 on the vehicle capsule 2, the wire 26 may be removed just after the vehicle capsule 2 being separated from the vehicle body 1, so that the vehicle capsule 2 can be moved in the water and on the water by itself perfectly and freely.

Further, in case the vehicle capsule 2 is separated from the vehicle body 1 and is received in a predetermined receiving place not in the vehicle body 1, the wire 26 and the fluid fin 22 and the like may be omitted.

Thus, in the present embodiment, in the state which the vehicle body 1 has moved to any location in the water, the vehicle capsule 2 may be separated from the vehicle body 1, so that the wire 26 to be drawn out under certain load by the resistance to the rotation of the fluid fin 22. When the vehicle capsule 2 has floated, the vehicle capsule 2 may be stopped at any location in the water or on the water by the operation of the brake device for stopping the drawing of the wire 26. In the state in which the vehicle capsule 2 has been mounted on the vehicle body 1, vehicle capsule 2 can be used for viewing the sight in the water by moving the vehicle capsule to travels along the travel rails 46. In addition, in the state in which the vehicle capsule has been floated in the water or on the water, the vehicle capsule can also be used for viewing the sight in the water or on the water. Therefore, by applying the present invention to game facilities such as an amusement park or the like, it is possible to provide a very joyful viewing facilities. When the vehicle capsule 2 floated, the drawing speed of the wire 26 can be controlled by a load applied to the wire 26, so that the vehicle capsule 2 may be floated very safely without sudden floating.

Further, by mounting a self-traveling device on the vehicle capsule 2, the wire 26 can be removed from the vehicle capsule 2 after floating of the vehicle capsule 2 onto the water, so that the vehicle capsule 2 can be moved on the water by itself through the self-traveling device. Therefore, it is possible for the vehicle capsule 2 to travel along the travel rails 46 and on the water. Thus, the self-traveling device may expand the range of movement of the vehicle capsule 2 and the range of viewing the sight.

It will be understood that the present invention is not limited to the above-described embodiments, and various modifications may be made.

What is claimed is:

1. An underwater and land travel system comprising a vehicle body which has a vehicle capsule releasably placed on an upper portion thereof and which is capable of being moved along travel rails which are laid to extend from on the land into the water under influence of the buoyancy of the vehicle body in the water and under the force of gravity on the land, the vehicle body and the vehicle capsule being connected to each other by a wire, and a drawing and rewinding device disposed in the vehicle body for drawing and rewinding the wire, the vehicle capsule being separated from the vehicle body in the state in which the vehicle body has been moved in the water, and the vehicle capsule being floated in the water or on the water by the drawing and rewinding device for drawing the wire at a certain length, and wherein:

a self-traveling device is mounted on said vehicle capsule, the self-traveling device can be operated in the state in which the vehicle capsule is separated from said vehicle body, a float control mechanism is mounted on said vehicle capsule for controlling a floating position and a floating direction, the wire may be removed from the vehicle capsule in the state in which the vehicle capsule is separated from the vehicle body, and said vehicle capsule is movable in the water and on the water by itself by means of the self-traveling device and the float control mechanism.

2. An underwater and land travel system comprising a vehicle body which has a vehicle capsule releasably placed on an upper portion thereof and which is capable of being moved along travel rails which are laid to extend from on the land into the water under influence of the buoyancy of the vehicle body in the water and under the force of gravity on the land, the vehicle body and the vehicle capsule being connected to each other by, a wire, and a drawing and rewinding device disposed in the vehicle body for drawing and rewinding the wire, the vehicle capsule being separated from the vehicle body in the state in which the vehicle body has been moved in the water, and the vehicle capsule being floated in the water or on the water by the drawing and rewinding device for drawing the wire at a certain length, and wherein:

said drawing and rewinding device comprises at least any one of devices such as a fluid fin for giving a certain load to the drawing of the wire, a brake device for stopping the drawing of the wire and a rewinding driving motor for rewinding the wire, a self-traveling device is mounted on the vehicle capsule, said self-traveling device operable in the state in which the vehicle capsule is separated from the vehicle body, a float control mechanism is mounted on said vehicle capsule for controlling a float position and a floating direction, said wire may be removed from said vehicle capsule in the state in which said vehicle capsule has separated from the vehicle body, and said vehicle capsule is movable in the water and on the water by itself by means of the self-traveling device and the float control mechanism.

* * * * *